(12) United States Patent
Lindskog et al.

(10) Patent No.: US 6,799,439 B1
(45) Date of Patent: Oct. 5, 2004

(54) METHOD FOR EQUALIZING TEMPERATURE DIFFERENCES IN MOLTEN GLASS, AND EQUIPMENT THEREFOR

(75) Inventors: Nils Lindskog, Hallstahammar (SE); Paul Buettiker, Charlottesville, VA (US)

(73) Assignee: Kanthal AB, Hallstahammar (SE)

( * ) Notice: Subject to any disclaimer, the term of this patent is extended or adjusted under 35 U.S.C. 154(b) by 0 days.

(21) Appl. No.: 09/601,905

(22) PCT Filed: Feb. 11, 1999

(86) PCT No.: PCT/SE99/00179

§ 371 (c)(1),
(2), (4) Date: Oct. 4, 2000

(87) PCT Pub. No.: WO99/41206

PCT Pub. Date: Aug. 19, 1999

(30) Foreign Application Priority Data

Feb. 11, 1998 (SE) ............................................. 9800397

(51) Int. Cl.[7] ............................................. C03B 5/435
(52) U.S. Cl. .................... 65/29.11; 65/29.21; 65/135.6; 65/346; 65/355
(58) Field of Search ............................ 65/29.11, 29.19, 65/29.21, 135.6, 346, 355, DIG. 4; 373/27, 107, 117, 119, 134, 136

(56) References Cited

U.S. PATENT DOCUMENTS

| 1,603,221 A | * | 10/1926 | Thomson |
| 2,422,734 A | * | 6/1947 | Jung |
| 3,198,619 A | * | 8/1965 | Nuzum |
| 3,326,655 A | * | 6/1967 | Penberthy |
| 3,585,268 A | * | 6/1971 | Monks et al. |
| 4,622,059 A | | 11/1986 | Brown ........................ 65/160 |
| 4,655,812 A | * | 4/1987 | Blumenfeld |

FOREIGN PATENT DOCUMENTS

DE 3528332 2/1987

* cited by examiner

*Primary Examiner*—Sean Vincent
(74) *Attorney, Agent, or Firm*—Alfred J. Mangels

(57) ABSTRACT

A method for equalizing temperature differences in molten glass in at least one temperature equalization zone that is in the form of a channel for transporting a glass melt. The equalization zone is located upstream from a tapping point, at which the glass is tapped into a mold in a forming machine, or the like. Resistor heating elements are provided in the temperature equalization zone side walls, bottom wall, and roof. The temperatures of the surfaces of the respective side walls, bottom wall, and roof that are in contact with the resistor heating elements are measured. The resistor heating elements are controlled by an electric controller so that the temperatures of the surfaces are substantially equal to a predetermined tapping temperature of the glass melt.

11 Claims, 3 Drawing Sheets

METHOD FOR EQUALIZING TEMPERATURE DIFFERENCES IN MOLTEN GLASS, AND EQUIPMENT THEREFOR

BACKGROUND OF THE INVENTION

1. Field of the Invention

The present invention relates to a method for equalizing temperature differences in molten glass upstream from a tap-off point at which the glass is tapped into a mould in a forming machine. Moreover, the invention relates to an equalizer, i.e. a channel in which temperature differences in the glass melt are equalized, said channel having its outlet at to the tap-off point.

2. Description of Related Art

In the production of glass products such as glass bottles and containers of different types, it is of prime importance for the glass melt to have a predetermined and uniform weight and is viscosity. If the weight and viscosity are not uniform, the yield drops sharply. This is because the molds are not filled sufficiently, and as a result the glass bottles do not have sufficient wall thickness and do not have the necessary strength.

The glass is melted in a glass furnace from which it is transported in the liquid state via a number of transport channels. In these transport channels, attempts are made to maintain a predetermined glass temperature while keeping the temperature in the glass melt as uniform as possible. Each transport channel leads into a so-called equalizer which comprises a relatively short channel with a typical length of a few meters or so. The purpose of the equalizer is to keep the glass melt at a very uniform temperature.

The viscosity of the glass is highly dependent on temperature. Consequently, local temperature differences in the transport channel, and particularly in the equalizer, will heavily influence production yield calculated as the weight of the produced products vis-a-vis the weight of the glass melt that leaves the tap-off point.

In conventional transport channels and qualizers, a mixture of heating zones and cooling zones is used along the transport channel and equalizer. The intention is to first cool the glass to an appropriate casting temperature and then equalize the temperature in the glass melt at the predetermined casting temperature so that it is uniform throughout a cross section of the glass melt taken at right angles to the longitudinal direction of the equalizer. The cooling zones usually comprise zones where no heating takes place. Instead, to the glass melt is permitted to cool down naturally. The heating zones usually incorporate heating with a gas burner, and here the flue gas sweeps along the exposed top surface of the glass melt, but resistor heating elements are also placed along the channel walls. In addition, molybdenum electrodes are inserted in the channels in such a way that the electrodes are surrounded by the glass melt, and electric current flows through the glass melt between the two electrodes.

In conventional facilities, the glass melt temperature is measured at a number of discrete points in the glass melt using thermocouples. These measured values are used to control the heating equipment. Experience has shown that it does not suffice to measure the temperature at a number of discrete points and, on this basis, control the heating equipment due to the fact that there are still local temperature gradients at the outer boundary surfaces of the glass melt.

The present invention solves this problem and comprises a method and equipment that provide a significantly more uniform temperature in the glass melt than provided by conventional technology, and this in turn provides a substantial increase in yield.

SUMMARY OF THE INVENTION

The present invention thus relates to a method for equalizing temperature differences in molten glass in at least one temperature equalization zone in the form of a channel intended to transport a glass melt, said zone being located upstream from a tap-off point at which the glass is tapped into a mold in a forming machine or the like. Resistor heating elements are provided in the temperature equalization zone walls, bottom and roof, and the temperatures of the surfaces of the respective walls, bottom and roof contacted by the resistor heating elements are caused to be measured. The resistor heating elements are controlled by an electric controller so that the temperatures of said surfaces are equal to or largely equal to a predetermined tapping temperature of the glass melt.

Moreover, the invention also relates to temperature equalizer apparatus.

BRIEF DESCRIPTION OF THE DRAWINGS

Below, the invention is described in greater detail, partially in connection with the attached drawings which show examples of embodiments of the invention and, in which.

DESCRIPTION OF THE PREFERRED EMBODIMENTS

Figure 1:
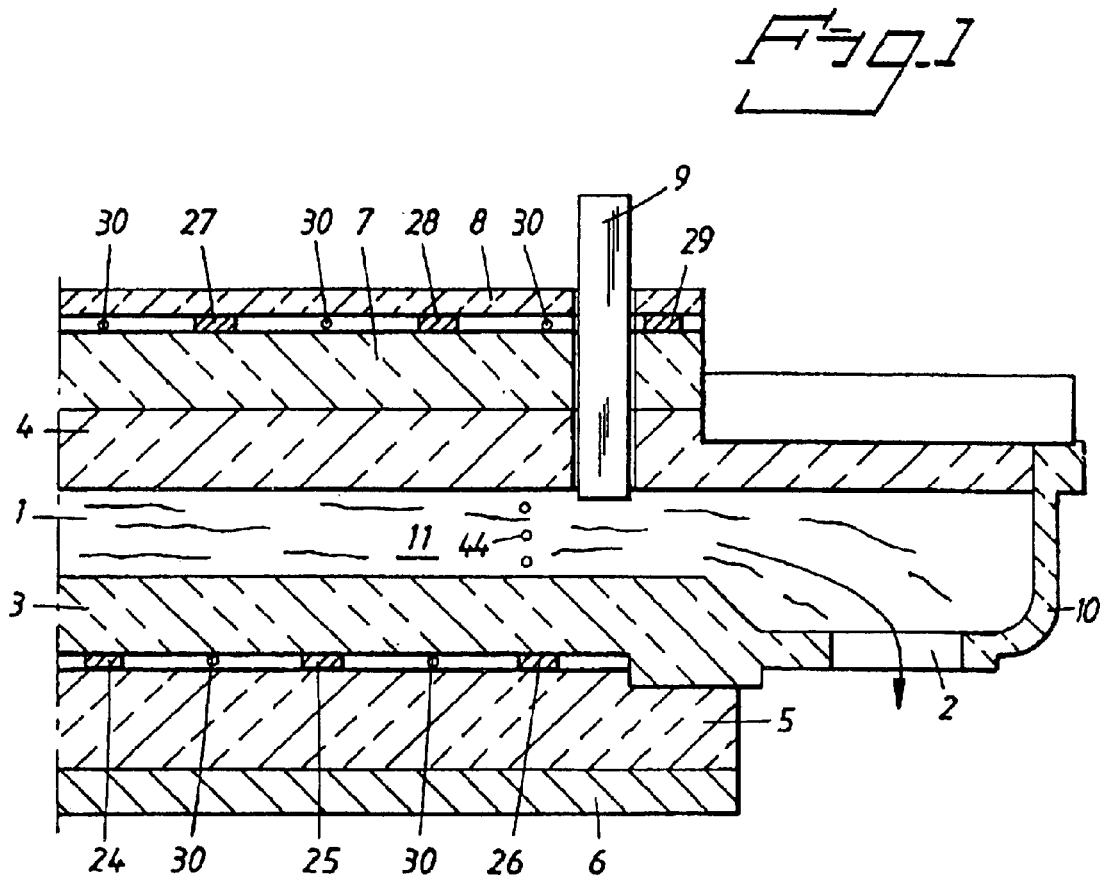
FIG. 1 shows a cross-section taken in the longitudinal direction of a part of a temperature equalization zone in accordance with the invention.
Figure 3:
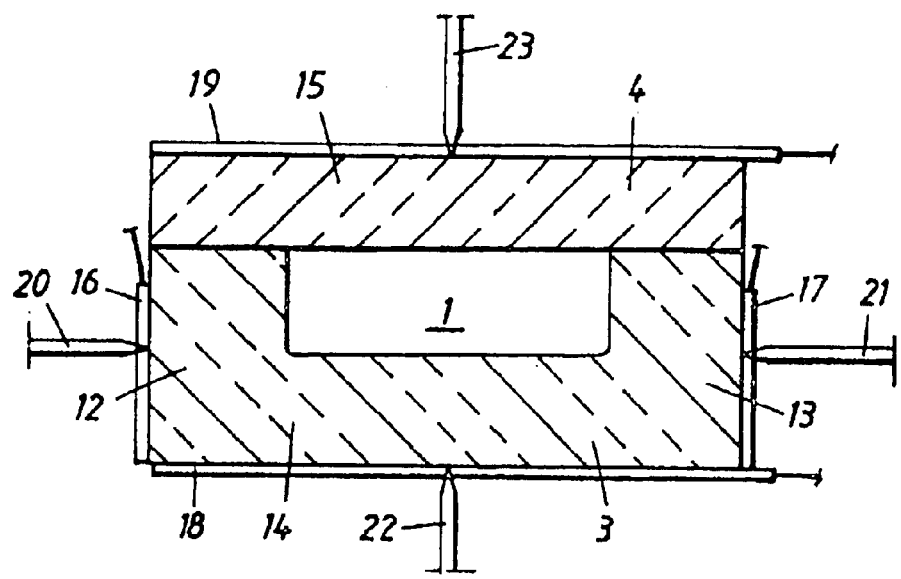
FIG. 3 shows a schematic cross-section taken through the temperature equalization zone.

FIG. 1 shows a longitudinal cross-section of a temperature equalization zone intended to equalize temperature differences in molten glass in the f rm f a channel 1 used to transport a glass melts. The zone is located upstream from a tap-off point 2 at which the glass is tapped into a mold (not shown) in a forming machine or the like. A cross-section of channel 1 is shown in FIG. 3. The channel is made of an appropriate ceramic material 3 such as aluminium oxide A1203.

The channel can, for example, be about 1000 millimeters wide and have a depth of about 150 millimeters. For such cross-sectional dimensions, the temperature equalization zone can be about 2000 millimeters long. Above the channel there is a roof 4 made of insulating refractory material, firebrick for example.

Beneath ceramic material 3 there is additional insulation 5 in the form of, for example, firebrick. The entire temperature equalization zone rests on supports in the form of a steel beam 6. Above roof 4 there is also additional insulation 7, 8 in the form of firebrick for example.

A stopper plug 9 is provided to prevent glass melt 11 from entering into a tapping zone 10 that includes tap-off point 2. The tapping zone is made of an appropriate ceramic material such as aluminium oxide.

In accordance with the invention, resistor heating elements are provided in the walls 12, 13, bottom 14 and roof 15 of the temperature equalization zone, see FIG. 3. In FIG. 3, numbers 16–19 represent such resistor heating elements. These are of an appropriately known type, supplied by, among others, KANTHAL AB located in Hallstahammar, Sweden.

In accordance with the invention, the temperatures of the surfaces of the walls, bottom and roof, respectively that are in contact with the resistor heating elements are measured, and said resistor heating elements 16–19 are controlled by an electric controller so that said temperatures of said surfaces are caused to be kept equal or largely equal to a predetermined tapping temperature of the glass melt.

The measurements are made using thermocouples 20–23 in the conventional way. Thermocouples 20–23 can be separate from the resistor heating elements or, alternatively, they can be integrated with the resistor heating elements.

It is preferred to have the resistor heating elements spaced at regular intervals along the temperature equalization zone. This is illustrated in FIG. 1 where bottom elements 24–26 and roof elements 27–29 are spaced at regular intervals. The to number 30 represents several thermocouples.

Figure 2:
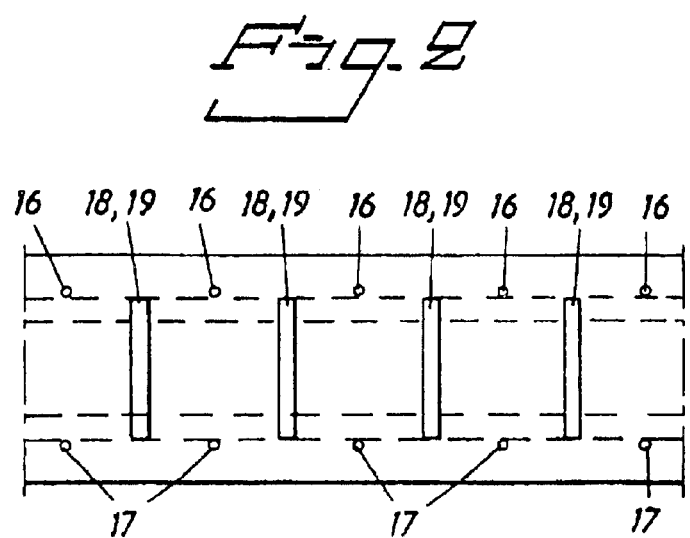
FIG. 2 shows a schematic top view of a temperature equalization zone and shows the positions of the resistor heating elements.

FIG. 2 illustrates the extent of roof and bottom elements 18, 19 (see FIG. 3) shown in a horizontal view. FIG. 2 also shows side elements 16, 17 (see FIG. 3) as circles These are interspersed with the bottom and roof elements in the longitudinal direction of the equalization zone.

In accordance with a preferred embodiment, the temperatures of the surfaces of the walls, bottom and roof which contact resistor heating element are caused to be measured as the temperatures of the respective resistor heating elements.

Figure 6:
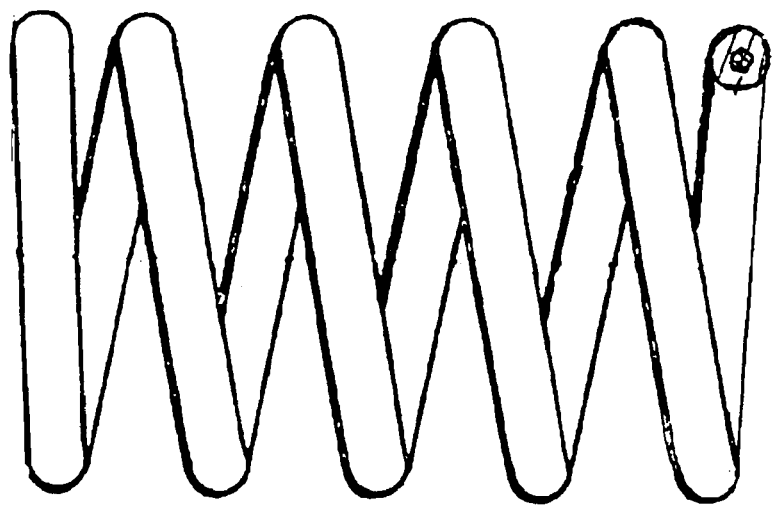
FIG. 6 is a perspective view of a portion of a spiral heating element.

In accordance with an embodiment, the resistor heating elements are spiral elements mounted in ceramic tubes on the outer surface of the ceramic material 3 that comprises said channel 1. It is this embodiment that is illustrated in FIG. 2 by circles 16, 17 and in FIG. 6.

Figure 7:
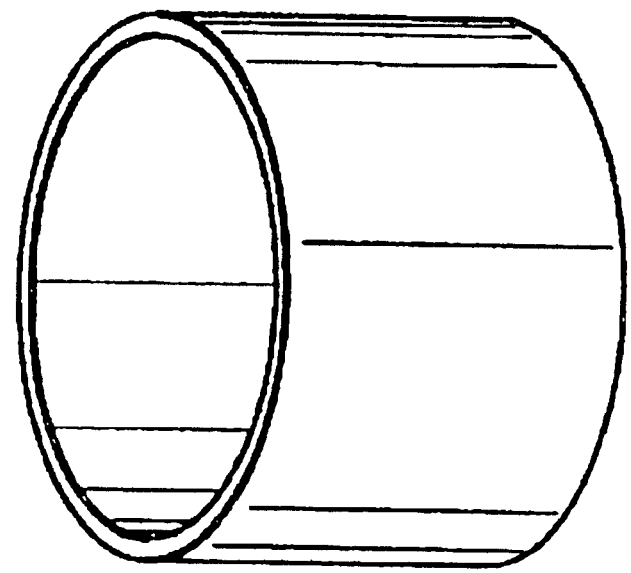
FIG. 7 is a perspective view of a band-shaped heating element.

In accordance with another embodiment, the resistor heating elements are band-shaped resistor elements that are mounted at the outer surface of the ceramic material 3 that comprises said channel 1. This embodiment is illustrated in FIG. 1 by elements 24–29 and in FIG. 7.

The way in which the elements are formulated is not of importance with regard to the invention. What is important is that there must be a sufficient number of elements having sufficiently high power output to be able to maintain a sufficiently high and predetermined temperature in the glass melt.

In accordance with a preferred embodiment, the temperature equalization zone is caused to have a length which corresponds to at least 1–2 times the width of said channel.

Figure 5:
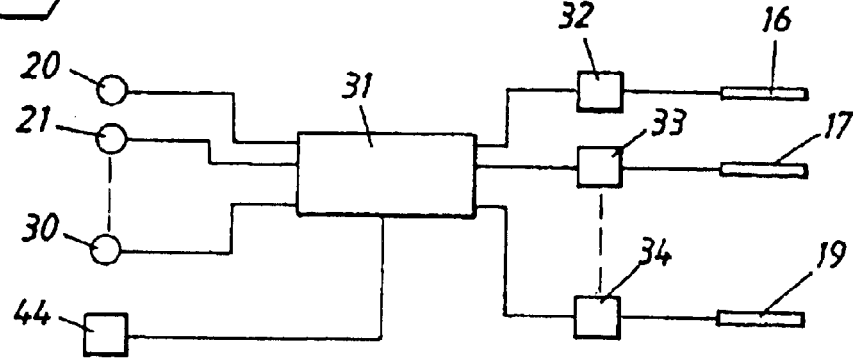
FIG. 5 shows a block diagram of the electric control

An electric controller was mentioned above. A block diagram in FIG. 5 shows such a controller. Appropriately, the controller incorporates a microprocessor 31 with associated memory and software. All thermocouples are connected to the microprocessor via suitable input circuits so that the microprocessor therewith obtains a signal that corresponds to the temperature measured by the respective thermocouple. The microprocessor is designed to control, via control circuits 32–34 which include thyristors, each and every resistor heating element, exemplified as elements 16, 17, 19 in FIG. 5, either individually or in groups.

To summarize, there is thus an equalization zone that includes a large number of resistor heating elements that are regulatable so that channel 1 can be kept at a predetermined temperature.

As set forth above, the temperatures of the surfaces of the respective walls, bottom and roof contacted by the resistor heating elements are caused to be measured and the resistor heating elements are caused to be controlled by the controller so that the temperatures of said surfaces are caused to be kept equal or largely equal to a predetermined tapping temperature of the glass melt.

Experience has shown that if the walls contacted by the resistor heating elements are at the temperature that was predetermined for the glass melt, the temperature gradient, after an initial warm-up period in the temperature equalization zone, through the material 3 that forms the channel will be zero or close to zero. This means that the inner channel walls will assume the predetermined temperature of the glass melt.

When the glass melt is transported to the temperature equalization zone, it has an average temperature that is close, or very close, to the desired tapping temperature, but the temperature is unevenly distributed through a cross-section of the glass melt taken at right angles to the transport direction of the glass melt. It is this uneven temperature distribution which gives rise to the problem mentioned in the introduction.

Immediately upstream of the tap-off point there are, arranged in a known manner, usually nine thermocouples 35–43 that form a matrix 44 located in channel 1 and used to measure the temperature distribution in the glass melt. Preferably, these thermocouples 44 are connected to the microprocessor. Consequently, the microprocessor can be arranged to issue a warning signal when the temperature distribution is not sufficiently uniform.

By means of the invention, the problem mentioned in the introduction is thus solved while providing a 10–15% increase in yield, as compared with a conventional temperature equalization zone. The main difference between using the present invention and a conventional method is that for a conventional temperature equalization zone the temperature of the inner surface of the channel is lower than the desired temperature of the glass melt.

Below are some examples of a practically conducted test.

The temperature equalization was 2440 millimeters long. The channel wad 1060 millimeters wide and 152 millimeters deep. Six bottom elements and six roof elements were spaced at regular intervals along the zone. Each element had a maximum power output of 2855 W. Six side elements were placed along the two sides of the zone and spaced at regular intervals. Each of these elements had a maximum power output of 595 W. The glass it was transported in the channel at a speed of 10 millimeters per second.

Figure 4:
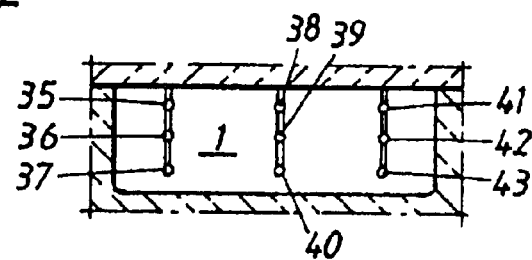
FIG. 4 shows the positions of the thermocouples in the channel of the temperature equalization zone.

Before the equalization zone was equipped with elements in accordance with the invention, the temperatures in said matrix 44 were as tabulated below in degrees centigrade (° C.) The values set forth below are for the positions shown in FIG. 4.

| 1166 | 1169 | 1166 |
| 1161 | 1175 | 1161 |
| 1153 | 1176 | 1153 |

The greatest temperature difference was thus 23° C.

After starting to use the invention, the corresponding temperatures were as follows.

| 1164 | 1166 | 1166 |
| 1163 | 1166 | 1162 |
| 1163 | 1166 | 1163 |

As these figures show, the greatest temperature difference was only 4° C.

Several examples of embodiments have been described above. However, it is obvious that the number of elements, the type of elements, the power outputs of the elements and the locations of the elements must be adapted to the temperature equalization zone in question. An expert, however, will have no difficulty in calculating the power output and the number of resistor heating elements needed to implement the invention in an existing or recently manufactured temperature equalization zone.

The existing invention shall therefore not be considered limited to what has been set forth above. Instead, it can be varied within the scope of what is set forth in the attached claims.

What is claimed is:

1. A method for equalizing temperature differences in molten glass in at least one temperature equalization zone that is in the form of side walls, a bottom wall, and a roof that define a channel to transport a glass melt, wherein the equalization zone is located upstream from a tap-off point at which the glass is topped into a mold in a forming machine or the like, said method comprising the steps of: providing resistor heating elements within the interior of each of the temperature equalization zone side walls, bottom wall, and roof, measuring the temperatures of surfaces within the interior of the respective side walls, bottom wall, and roof that are contacted by the resistor heating elements; and controlling the resistor heating elements by an electric controller so that the temperatures of said wall surfaces within the interior of the respective walls are substantially equal to a predetermined tapping temperature of the glass melt.

2. A method in accordance with claim 1, including the step of spacing the resistor heating elements at substantially regular intervals along the temperature equalization zone.

3. A method in accordance with claim 1, including the step of treating the temperatures of the surfaces of the respective side walls, bottom wall, and roof that are in contact with the resistor heating elements as the temperatures of the respective resistor heating elements.

4. A method in accordance with claim 1, including the step of forming the channel walls from a ceramic material, wherein the resistor heating elements include spiral elements carded in ceramic tubes mounted on an outer surface of the ceramic material that forms said channel walls.

5. A method in accordance with claim 1, including the step of forming the channel walls from a ceramic material, wherein the resistor heating elements include band-shaped resistor heating elements mounted on an outer surface of the ceramic material that forms said channel walls.

6. A method in accordance with claim 1, including the step of forming the temperature equalization zone to have a length corresponding to at least 1–2 times the width of said channel.

7. Apparatus for equalizing temperature differences in molten glass in at least one temperature equalization zone that is in the form of a channel to transport a glass melt, wherein the equalization zone is located upstream from a tap-off point at which the glass melt is tapped into a mold in a forming machine or the like, said apparatus comprising: a plurality of resistor heating elements disposed within the interior of each of the temperature equalization zone side walls, bottom wall, and roof; thermocouples provided on surfaces within the interior of the respective side walls, bottom wall, and roof that are in contact with said resistor heating elements for measuring channel surface temperatures; and an electric controller for controlling said resistor heating elements so that the temperatures of said wall surfaces within the interior of the respective walls are substantially equal to a predetermined tapping temperature of the glass melt.

8. Apparatus in accordance with claim 7, wherein the resistor heating elements are spaced at substantially regular intervals along the temperature equalization zone.

9. Apparatus in accordance with claim 7, wherein the channel walls are formed from a ceramic material, and wherein the resistor heating elements include spiral elements carried in ceramic tubes mounted on an outer surface of the ceramic material that forms said channel walls.

10. Apparatus in accordance with claim 7, wherein the channel walls are formed from a ceramic material, and wherein the resistor heating elements include band-shaped resistor heating elements mounted on an outer surface of the ceramic material that forms said channel walls.

11. Apparatus in accordance with claim 7, wherein the temperature equalization zone has a length corresponding to at least 1–2 times the width of said channel.

* * * * *

UNITED STATES PATENT AND TRADEMARK OFFICE
CERTIFICATE OF CORRECTION

PATENT NO.    : 6,799,439 B1
DATED         : October 5, 2004
INVENTOR(S)   : Nils Lindskog and Paul Buettiker It is certified that error appears in the above-identified patent and that said Letters Patent is hereby corrected as shown below:

Column 5,
Line 38, "topped" should read -- tapped --;
Line 42, "," should be -- ; --; and Column 6,
Line 7, "carded" should read -- carried --.

Signed and Sealed this

Eleventh Day of January, 2005

JON W. DUDAS
*Director of the United States Patent and Trademark Office*